United States Patent [19]

Silverwater

[11] 4,203,384

[45] May 20, 1980

[54] MAGNETIC PRESSURE INDICATOR WITH DEACTUATOR FOR BIMETALLIC TEMPERATURE-SENSITIVE ELEMENTS

[75] Inventor: Bernard F. Silverwater, Plainview, N.Y.

[73] Assignee: Pall Corporation, Glen Cove, N.Y.

[21] Appl. No.: 937,669

[22] Filed: Aug. 28, 1978

[51] Int. Cl.² ............................................. G01L 7/16
[52] U.S. Cl. .................................. 116/267; 116/268; 116/DIG. 42; 73/744
[58] Field of Search ............... 116/DIG. 42, 267, 268; 73/744

[56] References Cited

U.S. PATENT DOCUMENTS

| | | | |
|---|---|---|---|
| 3,077,854 | 2/1963 | Pall | 116/DIG. 42 |
| 3,187,711 | 6/1965 | Campolong | 116/DIG. 42 |
| 4,026,153 | 5/1977 | Silverwater | 116/267 |

Primary Examiner—Donald O. Woodiel

[57] ABSTRACT

A magnetic differential pressure indicator is provided for detecting and indicating a pressure differential thereacross that is greater than a predetermined value in a fluid system, having a port that permits introduction or withdrawal of fluid for testing of operability under the predetermined pressure differential, and having a bimetallic element that prevents false actuation of the element at abnormal temperature, and a deactuator for the bimetallic element that permits such testing of the indicator via the port for operability even at such abnormal temperature.

20 Claims, 3 Drawing Figures

MAGNETIC PRESSURE INDICATOR WITH DEACTUATOR FOR BIMETALLIC TEMPERATURE-SENSITIVE ELEMENTS

In any system wherein a fluid such as hydraulic fluid or the like is passed through a filter, it is customary to provide means for indicating when the filter element has become loaded, and requires replacement. Since the pressure drop across a filter increases in proportion to the accumulation of contaminants thereon, a suitable indication can be obtained by an indicator actuated when the differential pressure across the filter reaches a predetermined value. Many types of such devices are available, in which the indicating means is actuated mechanically, or electrically, or by other means.

One simple and very successful type of indicating device is the magnetic pressure indicator of U.S. Pat. No. 2,942,572 to David B. Pall. In this device, a first magnetic means is arranged to attract a second magnetic means so long as the two means are separated by less than a predetermined distance. Bias means propels the second magnetic element to an indicating position whenever that distance is exceeded. The first magnetic means is movable with a piston responsive to changes in pressure, and is normally biased towards the second magnetic means by a predetermined force. The second magnetic means is also movable with a piston, and while retained toward the first means by magnetic attraction when close enough thereto, is normally biased in a direction away from the first means by a force capable of overcoming the force of magnetic attraction whenever the first and second means are separated by the predetermined distance.

A particular advantage of the magnetic form of indicator is the sealing off of the second magnetic means from the fluid system, so that leakage is effectively prevented at the indicating mechanism. The second magnetic means can respond to changes of magnetic forces transmitted through the wall sealing it off from the fluid system. The magnitude of the force of magnetic attraction relative to the spring biasing force determines the predetermined pressure differential at which the device is actuated. Thus, the device can be arranged to be actuated at any required differential pressure, by simple adjustment of these forces.

In the usual form of this device, the second magnetic means is arranged to project from the housing after actuation. In another form, the second magnetic means is arranged to give an electric signal upon actuation. In either case, the device can be reset merely by pushing the second magnetic means back toward the first magnetic means, into a position where the magnetic force once again overcomes the spring-biasing force.

Modifications of and improvements in the magnetic differential pressure indicator of U.S. Pat. No. 2,942,572 are shown and described in U.S. Pat. Nos. 3,077,176, patented Feb. 12, 1963, 3,209,721, patented Oct. 5, 1965, 3,140,690, patented July 14, 1964, 3,785,332, patented Jan. 15, 1974, and 3,815,542, patented June 11, 1974.

Normally, such differential pressure indicators are provided with a bimetallic temperature sensitive element that changes the dimensions and position with temperature and locks the indicator so as to prevent false actuation at a pressure differential arising from temperature and not from a fault in a filter or elsewhere in the system.

Pressure indicators of this type have close tolerances for operability, since magnetic forces are exerted only over short distances from a magnet, and this requires that metal be used for the moving parts. As a result, corrosion becomes a problem, especially when in use over water and in polluted atmospheres, and can result in freezing and inoperability of the device. To ensure that the device is in working order, one must test the device at a simulated predetermined pressure differential. Such testing requires temporary inactuation of the bimetallic temperature-sensitive element, since one must be sure, if the device tests as inoperative, that it is not because the bimetallic element is preventing actuation. It also requires a port for access to the interior of the device, to apply the simulated pressure differential across the indicating element, i.e., the second magnetic means, in the device described above.

Frequently, it is desirable in hydraulic systems and like closed-circuit fluid systems to sample the fluid either before or after the differential pressure indicator has been actuated, in order to determine the condition of the fluid. Sampling makes it possible to determine when replacement of the fluid is desirable, for example.

Sampling is possible when a sampling port is provided in the fluid line. This requires that the line be readily accessible at the sampling port, and since hydraulic systems and like fluid systems are normally entirely concealed from view, this means running a branch line or by-pass line to the sampling location. This can be inconvenient, particularly in aircraft, where space is at a premium and the number of accessible locations is strictly limited.

A magnetic differential pressure indicator is normally positioned in an accessible location, because it is necessary for the indicator to be noted after actuation, and after actuation the indicator must of course be reset. Since the indicating member is entirely sealed off from the fluid line, and the actuating member responsive to differential pressure is in fluid flow connection with two portions of the fluid line, for instance, the upstream side of a filter and the downstream side of a filter, or other device across which the pressure differential is to be sensed, the differential pressure indicator provides an ideal location for sampling of fluid.

Silverwater U.S. Pat. No. 4,026,153, patented May 31, 1977 accordingly provides a magnetic pressure indicator of the types described in the above mentioned patents, having one or two sampling ports in the housing for sampling of fluid in the line, either upstream or downstream of the device, as desired. The sampling port is provided at a location which is accessible, avoids the necessity of imposing special fluid sampling ports and lines in the fluid system, with the resulting sealing problems, and at the same time is space-conserving, since one location can be used both for indicating the pressure differential and for sampling.

The sampling ports of such a device are suitable for introduction of a simulated pressure differential, for testing purposes. Accordingly, the invention employs a magnetic pressure indicator of the type described in the Silverwater patent.

In accordance with the invention, a magnetic differential pressure indicator of the Silverwater type having a bimetallic temperature sensitive element is provided with deactuating means for moving the bimetallic temperature sensitive element into non-actuating position, to permit introduction of fluid into the system via a port upstream of the indicator, or withdrawal of fluid via a port downstream of the indicator, so as to permit testing of the device for operability under the test conditions without interference by the bimetallic element with the actuation of the indicator. The test port or ports permits introduction of fluid at a faster rate than can be bled off through the small orifice from the upstream side of the sensing magnet or piston, resulting in a differential pressure in excess of the predetermined actuating pressure.

In addition to such a port, the indicator may include a conventional sampling port that features a sampling plug which allows addition or removal of any amount of fluid under system pressure in any orientation of the indicator encountered under service, while allowing movement of the indicating means to its normal indicating position during the testing.

The term "magnetic" as used herein encompasses both materials that are permanent magnets and materials that are attracted by magnets, whether permanently or temporarily magnetizable thereby.

The magnetic pressure indicator in accordance with the invention comprises a housing, and disposed in combination in the housing, a first magnetic means spaced from and arranged to attract or repel a second magnetic means or keeper so long as the two means or the first means and keeper are within their mutual magnetic fields of force; first bias means to retain the first magnetic means towards or away from the second magnetic means or keeper; the second magnetic means being normally retained in a first position; and second bias means to propel the second magnetic means from the first position to an indicating position whenever the spacing distance between the two magnetic means is changed; the first magnetic means being movable in response to changes in pressure, and normally biased toward or away from the second magnetic means by a predetermined force, and the second magnetic means being normally biased by the bias means in a direction away from the first means by a force capable of overcoming the force of magnetic attraction for the first means or the keeper whenever the first and second magnetic means are spaced by a predetermined distance; at least two fluid line connections, one connection leading to one side of the first magnetic means and another connection leading to another side of the first magnetic means, pressure in said line connections tending to move the first magnetic means in opposite directions; at least one test port in fluid flow connection with one of the first and second magnetic means for adjustment of fluid pressure to change the spacing distance between the two magnetic means and simulate actuation of the indicator for testing of the indicating capability of the indicator; a bimetallic temperature-sensitive element actuated at a predetermined temperature to engage one of the first and second magnetic means and prevent movement of the second magnetic means to an indicating position; and deactuating means for moving the bimetallic temperature-sensitive element into a nonactuating position during said testing.

The first magnetic means is movable with or is a first piston, movable in response to changes in pressure, and is normally biased toward or away from the second magnetic means or keeper by a predetermined force.

The housing is provided with at least two fluid line connections for connection for example to different portions of a fluid system, the differential pressure between which is to be detected by the indicator, and of these connections, one leads to one side of the first piston, and another leads to the other side of the first piston. The first piston is movable towards or away from the second magnetic means or keeper in response to line pressure in the two fluid line connections. At least one sampling port is provided in the housing, in fluid flow connection with one of the two fluid line connections. If desired, two sampling ports are provided, one in fluid flow connection with one of the fluid line connections, and the second with the other of the fluid line connections.

The second magnetic means is movable with or is a ball, or a second piston, and is retained toward the first magnetic means or keeper by magnetic attraction, when close enought thereto, but is normally biased in a direction away from the first means or keeper by a force capable of overcoming the force of magnetic attraction to the first means or keeper whenever the first and second magnetic means or keeper are spaced by a predetermined distance.

The first and second magnetic means are each movable, and can be magnets or attracted to magnets. The keeper is stationary, and is positioned therebetween, spacing them by a predetermined distance at least equal to the spacing dimension of the keeper, and can be a magnet or attracted by magnets, so that one at least of the magnetic means is attracted to the keeper. The other can be attracted to the keeper, or other magnetic means, or repelled by the keeper or the other magnetic means.

At least one of the two magnetic means and keeper is a magnet. Preferably, two of these elements (in any combination) are magnets, and if desired, all three can be magnets, but three are not always as advantageous as two. In addition, the keeper can be of nonmagnetic material.

If the keeper is a magnet and the first and second magnetic means are merely attracted thereto, the device functions because the first magnetic means when it moves away from or moves towards the keeper changes the magnetic field between the keeper and the second magnetic means.

The keeper normally serves as the separating wall between the first and second magnetic means, and prevents fluid communication between the spaces within which the first and second magnetic means move. The keeper can be a piece fitted between these spaces, or an integral part of the housing defining such spaces. If the spaces are bores, usually coaxial, the keeper can close off and separate the two parts of the bore from each other, and define a pair of blind bores within which the two magnetic means move.

The first magnetic means moves reciprocably, in response to changes in fluid pressure applied to opposed ends of either the magnetic means or the means on or in which it is carried. Accordingly, it can take any of several forms. It can, for example, be a piston, or part of a piston, as illustrated in the drawings, which can be in the form of a cylinder. The pressure is then applied to the ends of the piston at opposed ends of the cylinder. It can also take the form of a piston or part of a piston of high surface area, such as a flexible disc or diaphragm, as shown and described, for instance, in U.S. Pat. No. 3,077,176, dated Feb. 12, 1963, to David B. Pall et al, or a bellows.

The second magnetic means can be arranged to move reciprocably, as in a piston, or to rotate, as in a ball, for instance as in the device of U.S. Pat. No. 3,815,542. Accordingly, it also can be in the form of a piston. It can be arranged to project from the housing for the indicator, for a visual indication. It also can be arranged to actuate a switch, as in U.S. Pat. No. 3,077,854 to David B. Pall, dated Feb. 19, 1963, or to move an indicator, such as a pointer, or magnetic fibers, either directly or magnetically. The second magnetic means can also be a ball, carried in or on a ball.

The biasing means for the first and second pistons can take the form of a spring, such as a coil spring, a finger spring, a wave-form spring, a conical spring, or an annular disc spring, such as a Belleville spring. The biasing means can also be a third magnet, as disclosed in U.S. Pat. No. 3,140,690, to M. P. L. Siebel, in which case a spring can optionally be included or omitted.

The sampling and test ports can be provided in any portion of the housing or housing portion in which the first and/or second magnetic means is disposed. The sampling port or ports are in fluid flow connection with one or each of the line connections leading to each side of the first magnetic means. The test port is in fluid flow connection with one side of one of the first magnetic means. One test port and one sampling port or two sampling ports can be provided, one in fluid flow connection to one line connection, and one to the other. One or more through bores can be drilled in or cut out of the housing or molded into the housing tapping the fluid line connection at one end, or a passage leading to it, and extending to the outside of the housing at the other end. These can be only partially drilled or cut out, and the remainder knocked out, to open as many ports to whichever fluid lines are to be tapped, as may be desired.

The open ports are closed off by cocks or plugs, which are removed to tap the line, or add fluid to the line, for testing purposes. Any design of sampling plug can be used, held to the housing in a readily removable manner, such as by threads, a bayonet joint, a clamp, or a pin.

The sampling port can also be provided with a sampling valve, such as a ball, poppet, umbrella, or plunger type of valve. One preferred form of valve is illustrated in the drawings.

The bimetallic temperature-sensitive element is arcuate, in two layers in parallel about the curve, of two metals or alloys differing in their coefficient of expansion, so that the degree of curvature increases or decreases, as desired, with change in temperature, up or down. At a selected curvature assumed at the temperature when inactivation of the indicator is to occur, the element engages one of the two magnetic means of the indicator, prevents its movement, and thus prevents actuation of the indicator from that temperature and beyond. Such bimetallic elements are well known, and form no part of the invention, being conventional in all respects.

The deactuating means for the bimetallic element is arranged to temporarily engage and arrest the bimetallic element, moving it away from the magnetic means to a position in which it can no longer reach the magnetic means, and thus prevent it from inactivating the indicator. Release of the deactuating means restores the bimetallic element to its normal position.

The deactuating means is preferably movable manually towards an element-engaging position, and biased to move away automatically from said position, and return to its starting position. Thus, the deactuating means can easily be controlled manually into the said position for the testing period.

A preferred embodiment takes the form of a spring disc or washer, of metal or plastic, normally dished outwardly, and arranged to be pushed flat inwardly, expanding as it flattens into a position engaging the bimetallic element and moving it into nonactuating position. To facilitate this, a lug can be provided at the periphery of the disc. The resiliency of the disc or washer returns it to the normal position, when the pressure is released.

Another embodiment takes the form of a bowed rod or strip, also resilient and of metal or plastic, bowed outwardly, and arranged to be pushed inwardly and straightened out, expanding as it does so into a position engaging the bimetallic element, and moving it into nonactuating position. Again, its resiliency restores it to the bowed position, when the flexing pressure is released.

A push button or cap that can be pushed in by a finger can be used to move the disc, rod or strip into the expanded position, and when the disc, rod or strip return to normal position, it will push the button or cap out again, too. The cap can be transparent and protect the second magnetic means from the elements and contaminants.

If desired, a spring bias or magnetic bias can also be used, to return the deactuating means to normal position.

The drawings illustrate preferred embodiments of the invention.

Figure 1:
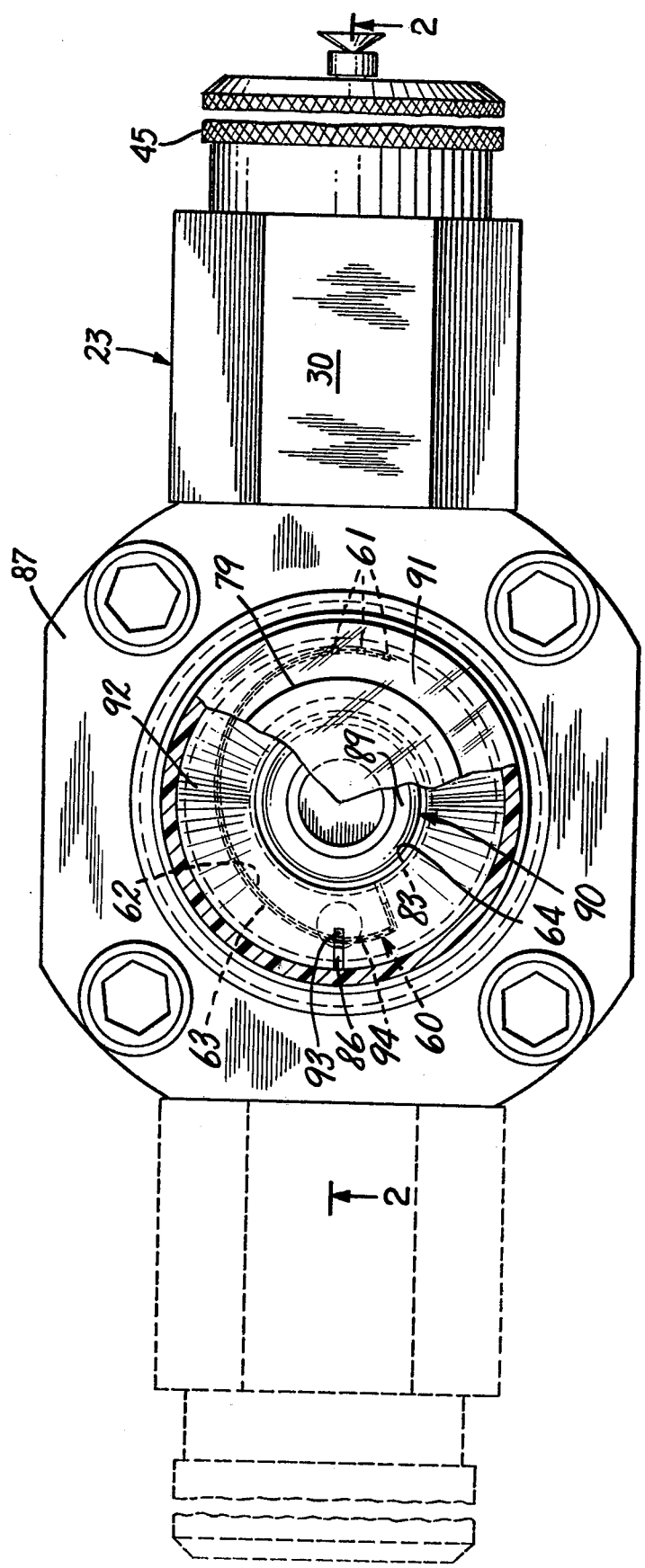
FIG. 1 is a top view of a typical pressure indicator according to the invention, in which the sampling plug and port project from the housing within which the device is disposed.

The pressure indicator of the Figures comprises first and second magnetic elements 1 and 2, respectively, coaxially mounted on opposite sides of a separating wall or keeper 3 of magnetic material within a housing 4, which may be of either magnetic or nonmagnetic material. Elements 1 and 2 are positioned adjacent the wall or keeper 3, with magnetic poles opposed, so that each is drawn toward the wall by the resulting force of magnetic attraction therebetween. Preferably, the magnetic elements 1 and 2 are composed of permanently magnetized metal, such as Alnico VI, Alnico VIII, or rare earth or ceramic magnetic material, or the like. If desired, however, one of the two elements such as element 2 may be formed of a suitable magnetic material such as iron, for example. Wall 3 is formed of a suitable magnetic material such as iron, for example, but it can also be of nonmagnetic material.

Mounted in a piston 5, magnetic element 1 and piston 5 are slidably supported in a cylindrical bore 6 in the housing 4, and are urged toward the wall or keeper 3 via bias means 7 which, in this embodiment, is a coil compression spring. The piston 5 and magnetic element 1 can also be all in one piece, of magnetic material. In order to prevent fluid from passing from the chamber 8 at the outer end of the bore 6 to the space 9 at the inner end, a liquid-tight seal is provided between the bore 6 and the piston 5 by an O-ring 10 and a ring 11, of Teflon or other suitable gasketing material. The seal may also be effected by close tolerances between the piston and bore, and the sealing rings omitted. The coil spring 7 is selected according to the desired actuating pressure to permit the piston 5 to move away from wall 3 in the bore 6 whenever the pressure at that end of the piston 5 exceeds the pressure at the other end by an amount equal to the actuating differential pressure.

In this embodiment of the invention, the pressure indicator is arranged to measure the pressure drop across a pressure-influencing component, such as a filter (not shown, but illustrated in U.S. Pat. No. 2,942,572). Thus, fluid under pressure is applied to the component such as a filter via an inlet line (not shown) and emerges on the other side of the component through an outlet line (not shown). The bore 12 in the cap 17 is in fluid-flow connection with the filter inlet line on the upstream side of the filter, and communicates fluid pressure in the inlet line via circumferential groove 14, and bore 15, in the housing 4, to the space 9 at the inner side of the piston 5, while the chamber 8 at the other end of the piston 5 is in fluid pressure communication with the outlet line on the downstream side of the filter via bore 13. The difference in pressure between the inlet and outlet lines is a measure of the pressure drop across and therefore the clogging of the filter or other pressure-influencing component, and the different pressures are thus communicated to opposite sides of the piston 5.

If desired, in order to prevent dirt carried by the incoming fluid on the upstream side of the filter from blocking the bore 15 and/or bore 6 and space 9, possibly obstructing movement of the piston, a suitable annular filter element 16, of sintered wire mesh, for example, is inserted over the outside of the housing 4, across the inner end of bore 12, in the line of flow to groove 14.

For ease in assembling of the piston 5, the bore 6 has its open end closed off by the cap 17, and the base of the spring 7 is retained by the cap against the abutment 18 of piston 5. The cap is permanently retained to the housing 4. The spring can also be retained by the housing in which the indicator is installed, in which event the cap can be omitted.

Drilled into the housing 4 are two bores 19, 20. Bore 19 at its inner end is in fluid-flow connection with a bore 21, extending parallel to bore 6 and opening into groove 24, which is in fluid flow connection with the inlet line upstream of the filter 16 via bore 12, and together constitute a sampling port. The bore 19 is provided with internal threads 22, into which is threaded a sampling plug 23, arranged to make it possible to withdraw fluid from the upstream line by way of bore 19. Bore 20 as shown constitutes a test port, and is described later, below.

The sampling plug 23 has a through central passage 30. The inner end of the passage 30 has a reduced portion 31 with a reentrant portion 32 at the outlet 33. Seated against the inside face of the reentrant portion is a coil compression spring 34, bearing a poppet ball 35 at the other end. A constriction 36 in the passage 30 provides a valve seat 37, against which the ball 35 is normally biased in a leak-tight seal by the spring 34, thus closing off the central passage 30 of the sampling plug 23.

On the other side of the constriction 36 in passage 30 is seated a coil spring 38, also of the compression type, carrying a valve actuator 40. The valve actuator includes a head 41 provided with a groove 42 and a stem 43. The head end of spring 38 is held against the inner face of the head 41 on the groove 44 of the stem 43. Movement of the actuator 40 against the spring 38 through the passage 36, so that the end of stem 43 is thrust against the poppet 35, moves the poppet inwardly, away from the valve seat 37, opening the passage 36 and the central passage 30 to flow of fluid from the bore 21. Normally, however, the valve actuator 40 is held in the inactive position as shown in FIGS. 1 and 2 by the spring 38, and the valve is closed.

The sampling plug is provided with a cap 45 having a threaded stem 46, which threads into the internal threads 47 at the outer end of the central passage 30. A V-ring (or O-ring) seal 48 is captured between the cap 45 and the inlet end 49 of the passage, sealing off the outer end of the passage 30 when the plug is threaded tightly down on the threads. The sampling plug is accordingly closed off at two places, valve 35 and cap 45.

Upon removal of the cap however, the valve actuator 40 becomes accessible. Insertion of a threaded flared cone fitting 50 (shown in dashed lines) into the inlet end 49 of the passage 30, on the internal threads of the passage, brings the rim of the conical tip 51 into contact with the periphery of the head 41 on the valve actuator 40. As the tip 51 of the flared cone 50 continues to be moved inwardly, the valve actuator 40 is pushed inwardly. Eventually, the stem 43 contacts and opens the valve 35 by moving the ball inwardly. Fluid then runs via groove 42 into the interior of the cone and emerges from the sampling plug 23. The extent of inward movement of the flared cone 50 determines the degree of opening of the valve, according to corresponding inward movement of the valve actuator. Thus, any desired degree of opening can be obtained, for slow or rapid fluid flow and sampling of a predetermined volume of fluid, as desired. Following the sampling, the flared cone 50 can be removed and the cap 45 reinstalled.

Figure 2:
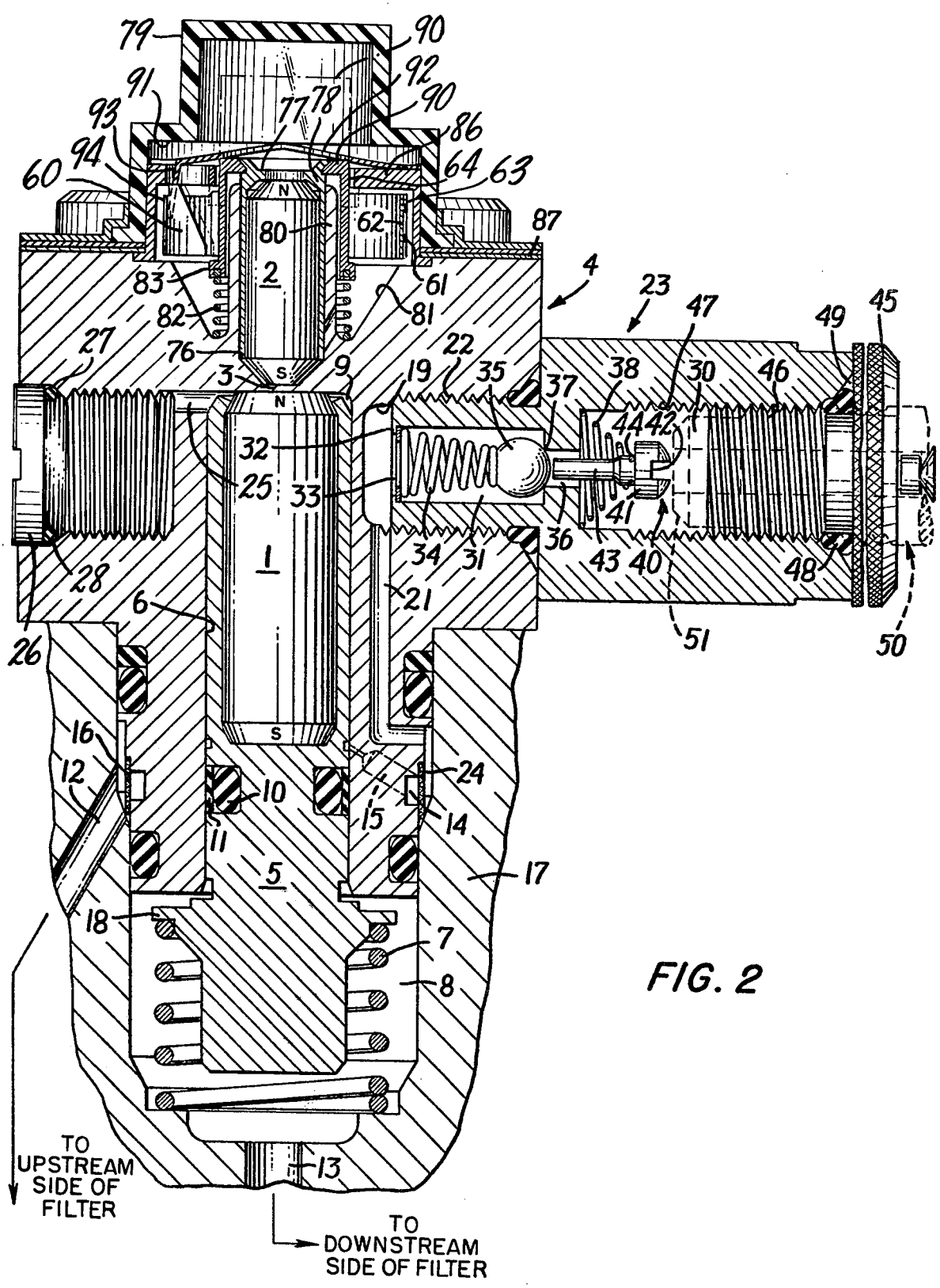
FIG. 2 is a view in longitudinal section taken through the pressure indicator of FIG. 1.

The device shown in FIGS. 1 and 2 includes also a test port 20 to introduce fluid upstream of the indicator. Port 20 has internal threads into which threads the cap 26, sealing against the port at surface 27 with an O-ring 28. The inner end of bore 20 is in fluid flow connection with chamber 9 above the piston 5 and first magnetic element 1 via bore 25.

The wall or keeper 3 is an integral part of the housing 4; but it may be press-fitted in a leak-tight fit at the upper end of second bore 76 of the housing 4. The bore 76 is coaxial with the bore 6, but it need not be. Secured across the end 77 of the magnetic element 2 by an annular flange 78 is a transparent flexible plastic cover 79, which extends over the open end of the cylindrical projection 80 of the housing 4, which defines the bore 76 therewithin. The cap protects the interior of the housing from entry of corrosion including moisture, salts and reactive gases and liquids.

In order to prevent the cap 90 and magnetic element 2 from being driven completely out of the bore 76 upon actuation, across the open end of the annular recess 81 extends an annular cover 86, retained there by a cover plate 87, snugly held to the housing 4. The inner flange 89 of the cover engages and retains the flange 91 of the cap 90. The flange 83 (which retains the spring 82) engages the cover 86 whenever the cap 90 is thrust outwardly by the spring, thereby preventing the cap 90 from proceeding further than the dashed-line position shown in FIG. 2.

Within an annular recess 81 in the housing 4, surrounding projection 80, is a second bias means 82 which, in this embodiment, is a compression coil spring which extends from the inner face of the indicator cap 90, within the flange 83 to the housing at the base of the recess 81, and urges the cap 90 and the magnetic element 2 to which it is attached away from the wall 3.

This spring is selected so that it is retained in the stressed condition while the magnetic element 2 is held against the wall or keeper 3 by the attractive force between the magnetic elements 1 and 2, or between element 2 and keeper 3; this attractive force between these elements is sufficient, so long as the adjacent poles of the magnetic elements 1 and 2 are separated by less than a predetermined distance, for example, one-sixteenth of an inch. Whenever the magnetic element 1 is moved away from the element 2 so that their adjacent poles are separated by more than one-sixteenth of an inch, however, the decreased force of magnetic attraction resulting therefrom is overcome by the force of the spring 82, and the cap 90 and element 2 are driven away from the wall 3.

A conventional bimetallic element 60 is attached to the cover 86 at welds 61, and extends around the cap 90. The bimetallic element 60 is preferably comprised of two arcuate inner and outer strip portions 62, 63 joined together, for example by a weld, and both arranged to bend inwardly upon contraction with decreasing temperatures. At normal temperatures, element 60 has a minimum radius greater than that of the flange 83, and permits the cap 90 to ride through the aperture therebetween on actuation. However, at temperatures below a preselected value, at which for example the fluid to be filtered increases appreciably in viscosity, for example 33° F. to 62° F., the element 60 contracts inwardly, so that the inner strip 62 extends over the face of the cap 90 just above and within the flange 83, thus engaging the flange, and preventing actuation of the pressure indicator.

Held between the flange 91 of the cover 79 and the cover 86 is a dished washer 92, having a lug 93 at one side. Pressure on the cover 79 flattens the washer 92, moving lug 93 out to engage the tip 94 of the bimetallic element 60. This pushes the tip 94 outwardly far enough to clear the flange 83, so that the indicator can actuate regardless of the temperature.

In operation, fluid pressure in the inlet line is communicated via the duct 12 to the space 9 of the cylindrical bore 6, urging the magnetic element 1 and piston 5 away from wall 3 against the force of the spring 7 and the pressure from the outlet line, communicated to space 8 via port 13. Whenever the difference between the inlet and outlet pressures is greater than the force of the spring 7, the piston 5 is driven away from wall 3 in the bore 6. After the magnetic element 1 is moved to a position more than approximately one-sixteenth of an inch away from the magnetic element 2, the attractive force therebetween is less than the force of the spring 82, and the magnetic element 2 is driven away from the wall 3 until the cap 90 (which if desired, may be of a suitable eye-catching color, such as red, orange or yellow) emerges and projects through the aperture 64 beneath cover 79, and the flange 83 abuts the inside surface of the cover 86, where it is held firmly by the spring 82, in the dashed-line position shown in FIG. 2.

The cap 90 in this position indicates that the pressure difference is greater than the predetermined value in accordance with which the spring 7 has been selected. As an example, the spring 7 may be arranged to permit the magnetic element 1 to be driven away from the wall 3 whenever the pressure difference exceeds 35 psi, and thus give a signal.

In the magnetic element 2 be pushed inwardly, while the magnetic element 1 is away from wall 3, the magnetic element 2 is not attracted to the wall or keeper 3 by a force greater than the biasing force of spring 82, and can be held in this position only while it is retained there manually. As soon as the manual force is removed, the piston returns to the indicating position shown in FIG. 2 under the force of the spring 22. However, if magnetic element 1 is in the normal position shown in FIG. 2, it will be held there, and the device is then ready for reactuation under the predetermined pressure differential.

At temperatures below 32° F., for example, the thermostatic element 60 contracts, to move the inner face 62 of the strip 60 over the cap 90 to engage the flange 83. Thus, when the piston and the magnetic element 2 seek to move away from the wall 3 under a differential pressure exceeding the biasing force of spring 7, resulting from increased viscosity of the fluid, the inner edge of the strip 60 intercepts the flange 83, preventing a false indication of, for example, filter clogging.

If desired, this pressure indicator may be utilized to indicate a total pressure above atmospheric instead of a pressure differential, by communicating port 13 opening to space 8 of bore 6 to the atmosphere. Similarly, an absolute pressure may be indicated by connecting the port 13 and space 8 of bore 6 to a vacuum.

If now the device is to be tested for operability, the test port 20 is opened by removing plug 26 and O-ring 28, and fluid added to chamber 9 upstream of the piston 5, in amount sufficient to move piston 5 away from element 2, and actuate the indicator. If the element 2 does not pop up into view, the cap 79 is pushed in slightly, flattening the washer 92, putting lug 93 into engagement with the tip 94 of the bimetallic element 60, so as to clear flange 83. Then the element 2 should pop. If it still does not, one can conclude the device is inoperative, and take the required remedial measures.

Figure 3:
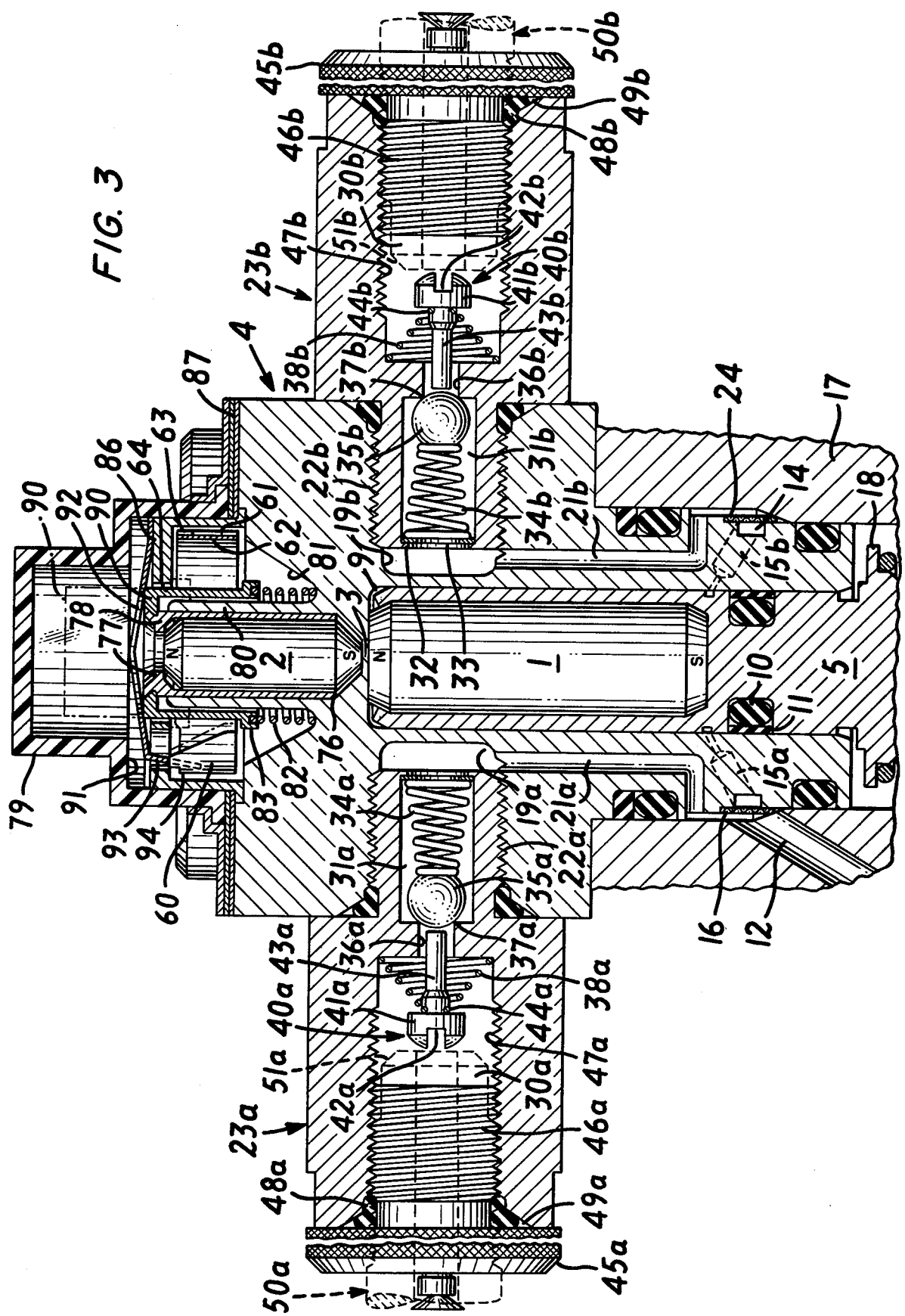
FIG. 3 is a view in longitudinal section taken through another embodiment of pressure indicator, having two sampling plugs and ports.

The pressure indicator of FIG. 3 is similar to that of FIGS. 1 and 2, except for the provision of two sampling ports 23a, 23b instead of one. The first and second magnetic elements 1 and 2, respectively, are coaxially mounted on opposite sides of a separating wall or keeper 3 of magnetic material within a housing 4, which may be of either magnetic or nonmagnetic material. Elements 1 and 2 are positioned adjacent the wall or keeper 3, with magnetic poles opposed, so that each is drawn toward the wall by the resulting force of magnetic attraction therebetween. Preferably, the magnetic elements 1 and 2 are composed of permanently magnetized metal, such as Alnico VI, Alnico VIII, or rare earth or ceramic magnetic material, or the like. If desired, however, one of the two elements such as element 2 may be formed of a suitable magnetic material such as iron, for example. Wall 3 is formed of a suitable magnetic material such as iron, for example, but it can also be of nonmagnetic material.

Mounted in a piston 5, magnetic element 1 and piston 5 are slidably supported in a cylindrical bore 6 in the housing 4, and are urged toward the wall or keeper 3 via bias means 7 which, in this embodiment, is a coil compression spring. The piston 5 and magnetic element 1 can also be all in one piece, of magnetic material. In order to prevent fluid from passing from the chamber 8 at the outer end of the bore 6 to the space 9 at the inner end, a liquid-tight seal is provided between the bore 6 and the piston 5 by an O-ring 10 and a ring 11, of Teflon or other suitable gasketing material. The seal may also be effected by close tolerances between the piston and bore, and the sealing rings omitted. The coil spring 7 is selected according to the desired actuating pressure to permit the piston 5 to move away from wall 3 in the bore 6 whenever the pressure at that end of the piston 5 exceeds the pressure at the other end by an amount equal to the actuating differential pressure.

In this embodiment of the invention, the pressure indicator is arranged to measure the pressure drop across a pressure-influencing component, such as a filter (not shown, but illustrated in U.S. Pat. No. 2,942,572). Thus, fluid under pressure is applied to the component such as a filter via an inlet line (not shown) and emerges on the other side of the component through an outlet line (not shown). The bore 12 in the cap 17 is in fluid-flow connection with the filter inlet line on the upstream side of the filter, and communicates fluid pressure in the inlet line via circumferential groove 14, and bore 15, in the housing 4, to the space 9 at the inner side of the piston 5, while the chamber 8 at the other end of the piston 5 is in fluid pressure communication with the outlet line on the downstream side of the filter via bore 13. The difference in pressure between the inlet and outlet lines is a measure of the pressure drop across and therefore the clogging of the filter or other pressure-influencing component, and the different pressures are thus communicated to opposite sides of the piston 5.

If desired, in order to prevent dirt carried by the incoming fluid on the upstream side of the filter from blocking the bore 15 and/or bore 6 and space 9, possibly obstructing movement of the piston, a suitable annular filter element 16, of sintered wire mesh, for example, is inserted over the outside of the housing 4, across the inner end of bore 12, in the line of flow to groove 14.

For ease in assembling of the piston 5, the bore 6 has its open end closed off by the cap 17, and the base of the spring 7 is retained by the cap against the abutment 18 of piston 5. The cap is permanently retained to the housing 4. The spring can also be retained by the housing in which the indicator is installed, in which event the cap can be omitted.

Drilled into the housing 4 are two bores 19a, 19b; bore 19a at its inner end is in fluid-flow connection with a bore 21a, and the bore 19b is in fluid-flow connection with a bore 21b, both extending parallel to bore 6, and opening into groove 24, which is in fluid-flow connection with the inlet line upstream of the filter 16 via bore 12. The bores 19a, 19b constitute two sampling ports. The bores 19a, 19b are provided with internal threads 22a, 22b, into which are threaded sampling plugs 23a, 23b, arranged to make it possible to withdraw fluid from the upstream line by way of bores 19a or 19b.

The sampling plugs 23a, 23b have through central passages 30a, 30b. The inner ends of the passages 30a, 30b have reduced portions 31a, 31b with reentrant portions at their outlets. Seated against the inside faces of the reentrant portions are coil compression springs 34a, 34b, each bearing a poppet ball 35a, 35b at the other end. Constrictions 36a, 36b in the passages 30a, 30b provide valve seats 37a, 37b against which the balls 35a, 35b are normally biased in a leak-tight seal by the springs 34a, 34b, thus closing off the central passages 30a, 30b of the sampling plugs 23a, 23b.

On the other side of the constrictions 36a, 36b in passages 30a, 30b are seated coal springs 38a, 38b, also of the compression type, carrying valve actuators 40a, 40b. The valve actuators include heads 41a, 41b provided with grooves 42a, 42b and stems 43a, 43b. The heads ends of springs 38a, 38b are held against the inner faces of the heads 41a, 41b on the grooves 44a, 44b of the stems 43a, 43b. Movement of the actuators 40a, 40b against the springs 38a, 38b through the passages 36a, 36b so that the ends of stems 43a, 43b are thrust against the poppets 35a, 35b moves the poppets inwardly, away from the valve seats 37a, 37b, opening the passages 36a, 36b and the central passages 30a, 30b to flow of fluid from the bores 21a, 21b. Normally, however, the valve actuators 40a, 40b are held in the inactive position, as shown in FIG. 3 by the springs 38a, 38b and the valves are closed.

The sampling plugs are provided with caps 45a, 45b having threaded stems 46a, 46b, which thread into the internal threads 47a, 47b at the outer ends of the central passages 30a, 30b. V-ring (or O-ring) seals 48a, 48b are captured between the caps 45a, 45b and the inlet ends 49a, 49b of the passages, sealing off the outer ends of the passages 30a, 30b when the plugs are threaded tightly down on the threads. The sampling plugs are accordingly closed off at two places, valves 35a, 35b and caps 45a, 45b.

Upon removal of the caps, however, the valve actuators 40a, 40b become accessible. Of course, only one cap would normally be removed at a time. Insertion of a threaded flared cone fitting 50a, 50b (shown in dashed lines) into the inlet ends 49a, 49b of the passages 30a, 30b on the internal threads of the passages, brings the rim of the conical tips 51a, 51b into contact with the periphery of the heads 41a, 41b on the valve actuators 40a, 40b. As the tips 51a, 51b of the flared cones 50a, 50b continue to be moved inwardly, the valve actuatos 40a, 40b are pushed inwardly. Eventually, the stems 43a, 43b contact and open the valves 35a, 35b by moving the balls 35a, 35b inwardly. Fluid then runs via grooves 42a, 42b into the interior of the cone, and emerges from the sampling plugs 23a, 23b. The extent of inward movement of the flared cones 50a, 50b determines the degree of opening of the valve, according to corresponding inward movement of the valve actuator. Thus, any desired degree of opening can be obtained, for slow or rapid flow and sampling of a predetermined volume of fluid as desired. Following the sampling, the flared cone 50a, 50b can be removed and the caps 45a, 45b reinstalled.

In the embodiments shown in the drawings, the magnetic elements 1 and 2 are arranged so as to attract each other, with opposed poles. An equivalent result can be obtained by arranging the elements 1 and 2 so as to be mutually repelling, with like poles facing each other. This requires only a small modification of the structure shown, that would be obvious to anyone skilled in this art with a knowledge of magnetic principles, using the principles of this invention as discussed above.

In the embodiments shown in FIGS. 1, 2 and 3, the magnetic element 1 can be reversed, so that the south pole faces the south pole of magnetic element 2, and the element 1 relocated so that it is at the opposite end of the bore, in its normal position, with the spring 7 relocated to the opposite side of the piston, to bias it in the opposite direction. The pressure-sensing line connections 12 and 13 also have to be reversed, so that outlet line pressure is sensed via bore 12 and inlet line pressure sensed via port 13. Now, a pressure differential sensed by the piston 1 via bore 12 and port 13 tends to move the piston towards wall 3, repels magnetic elements 2 away from wall 3, and eventually to an actuating position. In this type of embodiment, of course, elements 1 and 2 must both be magnets, unless wall 3 is a magnet of opposite polarity instead of element 2.

It will be understood that the devices shown are designed so that the higher pressure of the two pressures being sensed is communicated to the piston 1 via bore 12. When the magnetic elements are repelling, the higher pressure is communicated to the piston 1 via port 13.

The sampling port 19 is not necessary, and can be omitted, except in a fluid system which is so fluid-tight that addition of fluid via port 20 cannot be effective to move piston 5 until fluid is bled off, in which event the sampling port 19 can be used for this purpose.

The sampling ports and their modifications of the invention can also be included in the housings of other types of magnetic pressure indicators, such as any of those of U.S. Pat. Nos. 2,942,572, 3,077,176, 3,140,690, 3,785,332 and 3,815,542.

Having regard to the foregoing disclosure, the following is claimed as the inventive and patentable embodiments thereof:

1. A magnetic pressure indicator having provision for testing of the indicating capability thereof without interference by a bimetallic temperature sensitive element with actuation of the device, comprising a housing and, disposed in combination in the housing, a first magnetic means spaced from and arranged to attract or repel a second magnetic means or keeper so long as the two means or the first means and keeper are within their mutual magnetic fields of force; first bias means to retain the first magnetic means towards or away from the second magnetic means or keeper; the second magnetic means being normally retained in a first position; and second bias means to propel the second magnetic means from the first position to an indicating position whenever the spacing distance between the two magnetic means is changed; the first magnetic means being movable in response to changes in pressure, and normally biased toward or away from the second magnetic means by a predetermined force, and the second magnetic means being normally biased by the bias means in a direction away from the first means by a force capable of overcoming the force of magnetic attraction for the first means or the keeper whenever the first and second magnetic means are spaced by a predetermined distance; at least two fluid line connections, one connection leading to one side of the first magnetic means and another connection leading to another side of the first magnetic means, pressure in said line connections tending to move the first magnetic means in opposite directions; at least one sampling port in fluid flow connection with one of the magnetic means for adjustment of fluid pressure to change the spacing distance between the two magnetic means and simulate actuation of the indicator for testing of the indicating capability of the indicator; a bimetallic temperature-sensitive element actuated at a predetermined temperature to engage one of the first and second magnetic means and prevent movement of the second magnetic means to an indicating position; and deactuating means for moving the bimetallic temperature-sensitive element into a non-actuating position during said testing.

2. A magnetic pressure indicator according to claim 1, in which the second magnetic means is in the form of a piston, moving in a bore into which the recess opens.

3. A magnetic pressure indicator according to claim 1, in which the second magnetic means is a piston of high surface area.

4. A magnetic pressure indicator according to claim 1, in which at least one of the first and second bias means is a spring.

5. A magnetic pressure indicator according to claim 1, in which at least one of the first and second bias means is a magnet.

6. A magnetic pressure indicator according to claim 1, having at least one sampling port in fluid flow connection with one of the fluid line connections.

7. A magnetic pressure indicator according to claim 6, having two sampling ports, one in fluid flow connection with one fluid line upstream and the other in fluid flow connection with the other fluid line downstream of a filter.

8. A magnetic pressure indicator according to claim 6, in which the sampling port comprises a valve for release of fluid from the line.

9. A magnetic pressure indicator according to claim 8, in which the valve is actuated by a flared cone.

10. A magnetic pressure indicator according to claim 1, having the bimetallic temperature-sensitive element means arranged to prevent movement of at least one of the first and second magnetic means at temperatures below a predetermined minimum.

11. A magnetic pressure indicator according to claim 1, in which both the first and second magnetic means are magnets.

12. A magnetic pressure indicator according to claim 1, in which one of the first and second magnetic means is a magnet, and one is of magnetizable material.

13. A magnetic pressure indicator according to claim 1, in which the first and second magnetic means are separated by a wall, both of the magnetic means are of magnetizable material, and the wall is a magnet.

14. A magnetic pressure indicator according to claim 1, in which one of the first and second magnetic means is a magnet and the wall is a magnet.

15. A magnetic pressure indicator according to claim 1, in which the first and second magnetic means are mutually attracting.

16. A magnetic pressure indicator according to claim 1, in which the first and second magnetic means are mutually repelling.

17. A magnetic pressure indicator according to claim 1, in which the deactuating means is an outwardly bowed annular disc arranged to be flattened and thus moved into a position in which it moves the bimetallic temperature-sensitive element.

18. A magnetic pressure indicator according to claim 17, in which the disc has a peripheral projection which engages the bimetallic temperature-sensitive element.

19. A magnetic pressure indicator according to claim 17, having a resilient protective cover extending over the second magnetic means when in an indicating position and in contact with the annular disc, arranged upon application of pressure thereto to flatten the disc.

20. A magnetic pressure indicator according to claim 19, in which the cover is a transparent plastic dome.

* * * * *